United States Patent [19]

Schaefer

[11] Patent Number: 5,299,841
[45] Date of Patent: Apr. 5, 1994

[54] SAFETY FLOW RESTRICTOR FOR EXPANSION JOINTS

[75] Inventor: David A. Schaefer, Grand Island, N.Y.

[73] Assignee: Adsco Manufacturing Corp., Buffalo, N.Y.

[21] Appl. No.: 18,855

[22] Filed: Feb. 8, 1993

[51] Int. Cl.$^5$ ............................................. F16L 27/02
[52] U.S. Cl. .................................. 285/299; 285/227; 285/301
[58] Field of Search ............... 285/299, 300, 301, 227, 285/228

[56] References Cited

U.S. PATENT DOCUMENTS

| | | | |
|---|---|---|---|
| 1,213,906 | 1/1917 | Ray | 285/301 |
| 1,873,703 | 8/1932 | Giesler | 285/300 |
| 1,968,715 | 7/1934 | Slade | 285/300 |
| 1,992,612 | 2/1935 | Hall | 285/301 |
| 2,044,430 | 6/1936 | Hall | 285/300 |
| 2,911,238 | 11/1959 | Myers et al. | 285/301 |

FOREIGN PATENT DOCUMENTS

| | | | |
|---|---|---|---|
| 683468 | 3/1964 | Canada | 285/300 |
| 1142257 | 1/1963 | Fed. Rep. of Germany | 285/300 |

Primary Examiner—Eric K. Nicholson
Attorney, Agent, or Firm—Hodgson, Russ, Andrews, Woods & Goodyear

[57] ABSTRACT

An expansion joint for coupling two conduits in a manner allowing relative axial movement therebetween and including an external shell or housing receiving the ends of both conduits and receiving an end of at least one of the conduits in a manner allowing relative axial movement of the end of the conduit in the shell, a flexible metal bellows in the shell connected to the shell and to the end of the one conduit for allowing relative axial movement between the ends of the conduits and for providing a fluid seal between the interiors of the conduits and the end of the expansion joint which receives the one conduit, and characterized by a safety flow restrictor operatively associated with the shell and with the one conduit for restricting fluid flow out the end of the expansion joint which receives the one conduit in the event the bellows fails to maintain the afore-mentioned fluid seal. The safety flow restrictor comprises a member surrounding the other conduit in close-fitting axially movable relation and a retainer defining an axial region holding the member against axial movement relative to the shell and allowing limited movement of the member in directions substantially perpendicular to the longitudinal axes of the other conduit and the shell. The safety flow restrictor can be incorporated in a single expansion joint wherein one conduit is fixed to the external shell or housing and the other conduit is movable therein and it can be incorporated in a double expansion joint including two conduits having ends thereof axially movable within a common external shell or housing.

9 Claims, 2 Drawing Sheets

SAFETY FLOW RESTRICTOR FOR EXPANSION JOINTS

BACKGROUND OF THE INVENTION

This invention relates to the art of pipe expansion joints, and more particularly to a new and improved expansion joint providing restriction against fluid leakage.

One area of use of the present invention is with externally pressurized guided expansion joints, although the principles of the present invention can be variously applied. Such expansion joints couple the ends of two pipes or conduits containing high pressure steam or similar fluids in a manner accommodating limited axial movement of the two pipes. In particular, in an illustrative expansion joint an end of one pipe is fixed via a first annular ring to one end of an external shell. The other end of the shell is provided with a second annular ring through which an end of another pipe extends in an axially movable manner, and a flexible coupling member such as an axially expandable bellows is joined between the end of the other pipe and the second annular ring within the external shell to accommodate limited axial movement of the pipes.

The outer surface of the bellows is exposed to the fluid in both pipes. The external shell is designed to withstand full line pressure thereby preventing the escape of fluid in a radial outward direction. In order to accommodate some degree of relative movement between the pipes in other than axial directions, such as during installation of the expansion joint or during use, there must be a gap of sufficient size between the outer surface of the above-mentioned other pipe and the inner surface of the second annular ring. However, such gap or space can provide an escape path for axial flow of fluid in the event of a leak in the flexible coupling or bellows.

It would, therefore, be highly desirable to provide such an expansion joint of the externally pressurized, guided type which limits or restricts flow of fluid out of the end of the joint in the event of a leak in the flexible coupling or expandable bellows thereof.

SUMMARY OF THE INVENTION

It would, therefore, be highly desirable to provide a new and improved pipe expansion joint which includes restriction against fluid leakage in an axial direction.

It is a more particular object of the present invention to provide such an expansion joint of the externally pressurized, guided type which provides such restriction against fluid leakage in the event of a leak in the flexible coupling thereof.

It is a further object of this invention to provide such a safety flow restrictor for expansion joints which is relatively simple in structure and effective in operation.

The present invention provides an expansion joint for coupling two conduits in a manner allowing relative axial movement therebetween and including an external shell or housing receiving the ends of both conduits and receiving an end of at least one of the conduits in a manner allowing relative axial movement of the end of the conduit in the shell, flexible coupling means in the shell connected to the shell and to the end of the one conduit for allowing relative axial movement between the ends of the conduits and for providing a fluid seal between the interiors of the conduits and the end of the expansion joint which receives the one conduit and characterized by flow restrictor means operatively associated with the shell and with the one conduit for restricting fluid flow out the end of the expansion joint which receives the one conduit, in the event the flexible coupling means fails to maintain the afore-mentioned fluid seal. The flow restrictor means comprises a member surrounding the other conduit in close-fitting axially movable relation and a retainer defining an axial region holding the member against axial movement relative to the shell and allowing limited movement of the member in directions substantially perpendicular to the longitudinal axes of the other conduit and the shell. The flow restrictor means can be incorporated in a single expansion joint wherein one conduit is fixed to the external shell or housing and the other conduit is movable therein, and it can be incorporated in a double expansion joint including two conduits having ends thereof axially movable within a common external shell or housing.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
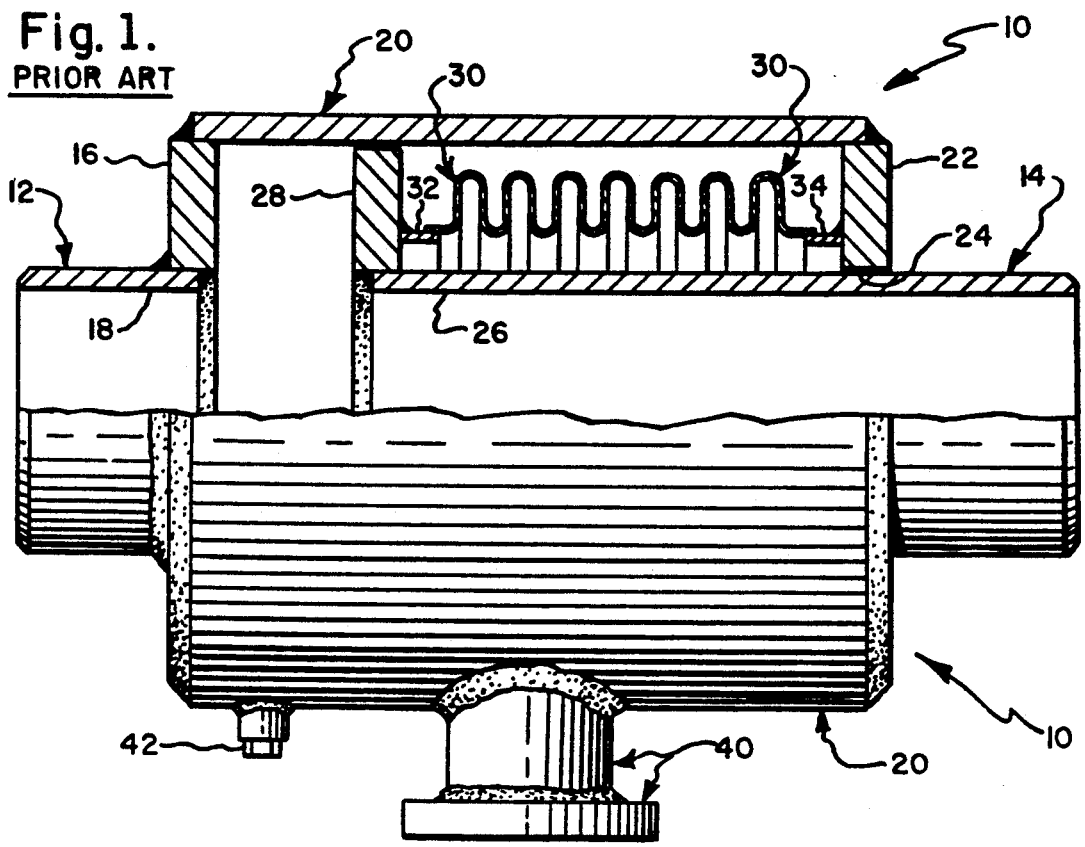
FIG. 1 is a side elevational view, partly in section, of a basic externally pressurized guided expansion joint.

FIG. 1 shows a basic pipe expansion joint which in the present illustration is a single externally pressurized guided expansion joint generally designated 10 between two pipes or conduits 12 and 14. A first end ring 16 is fixed by welding to an end 18 of conduit 12. Ring 16, in turn, is fixed by welding to one end of an external shell 20 of expansion joint 10 which shell or housing 20 is cylindrical in shape. A second end ring 22 is fixed by welding to the opposite end of shell 20, and ring 22 has an inner diameter or opening 24 of a size to receive conduit 14 therein in axially movable relation. An end 26 of conduit 14 is within shell 20, and a third end ring 28 is fixed to conduit end 26 by welding. The outer diameter of ring 28 is less than the inner diameter of shell 20 to accommodate relative axial movement between conduit 14 and shell 20. A flexible coupling means in the form an axially expandable metal bellows 30 is connected to end 26 of conduit 14 and to shell 20. In particular, one end of bellows 30 is welded to a second end band 34 which, in turn, is welded to end ring 22. Bellows 30 allows relatively axial movement between the ends of conduits 12 and 14 operatively associated with expansion joint 10, and bellows 30 provides a fluid seal between the interiors of conduits 12,14 and the gap or opening between the inner diameter of ring 22 and the outer diameter of conduit 14.

Expansion joint 10 can be provided with a base 40 for mounting or anchoring to a suitable support. Alternatively, pipes 12 and 14 each can be provided with a suitable anchor or mount (not shown). The bottom portion of shell 20 as viewed in FIG. 1 is provided with a drain opening closed by a plug 42.

Expansion joint 10 of the externally pressurized guided type shown in FIG. 1 is designed for axial movement only with pressure being applied externally to the corrugations of bellows 30. This results in an expansion joint capable of absorbing large amounts of axial movement, since an unlimited number of corrugations can be used without concern for bellows instability or squirm, which can be a limitation with internally pressurized designs. Thus, in the event of a leak or rupture in bellows 30 causing its collapse, fluid pressure acting on end ring 28 would cause movement of conduit 14 and end ring 28 therethrough in a direction to the right in FIG. 1 applying full line pressure of the interior of conduits 12 and 14 on the inner surface of the shell 20. However, shell 20 is constructed to withstand this full line pressure thereby preventing escape of fluid in a radially outward direction.

The gap or space between the inner diameter of ring 22 and the outer diameter of conduit 14 accommodates relative axial movement between conduit 14 and shell 20. This gap or space also must accommodate some relative movement between conduits 12,14 in other than an axial direction, i.e. slight radial or slight canting movement, which movement is encountered during installation of expansion joint 10 and/or during operation thereof. However, in the event of a major failure of bellows 30 such as leak or rupture therein, the aforementioned gap can provide an escape path for high pressure and temperature fluid such as stream in an axial direction out of the end of expansion joint 10 with the resultant safety hazard associated with such flow.

Figure 2:
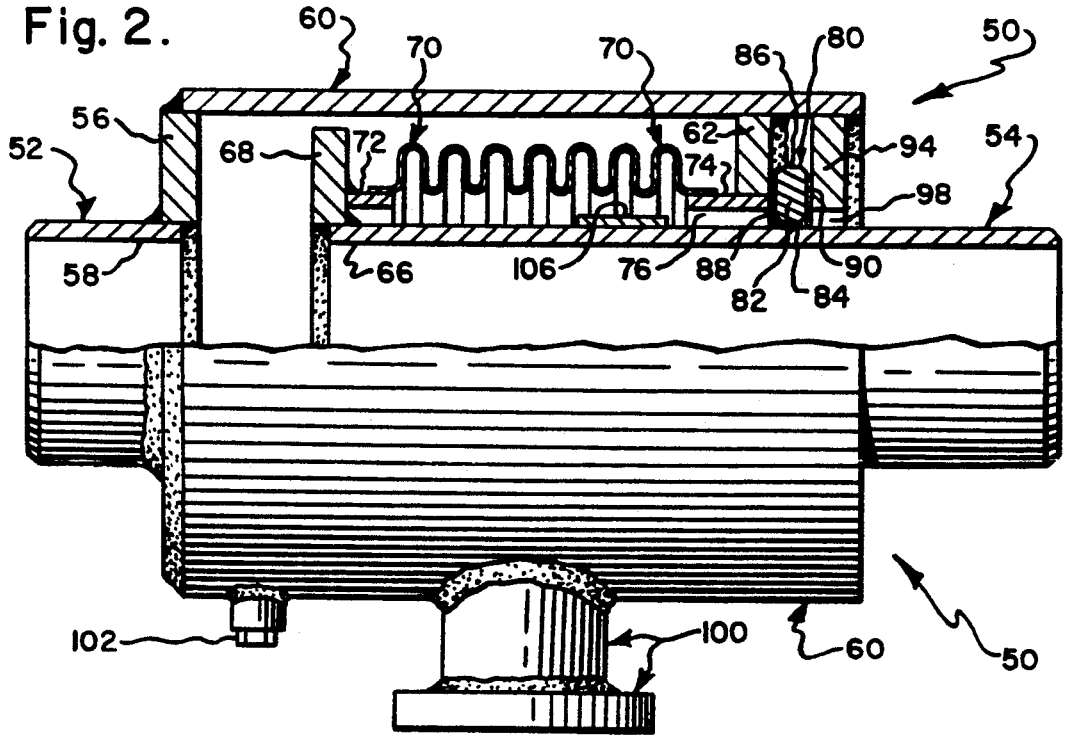
FIG. 2 is a fragmentary longitudinal sectional view of an expansion joint of the type shown in FIG. 1 and provided with the safety flow restrictor of the present invention.

FIG. 2 shows an expansion joint 50 according to the present invention provided with means for limiting or restricting the flow of fluid out of the end of joint 50 in the event of a major failure in the flexible coupling or expandable bellows of joint 50. Expansion joint 50, like expansion joint 10 in FIG. 1, is of the externally pressurized guided type and is between two pipes or conduits 52 and 54. A first end ring 56 is fixed by welding to an end 58 of conduit 52. Ring 56, in turn, is fixed by welding to one end of an external shell or housing 60 which is cylindrical in shape. A second end ring 62 is fixed by welding to the inner surface of shell 60 at a location a short distance axially inwardly from the opposite end of shell 60 for a purpose which will be described. Ring 62 receives conduit 54 therein in an axially movable manner. Ring 62 has an inner diameter somewhat larger than the inner diameter of ring 22 in the expansion joint 10 of FIG. 1 also for a purpose which will be described. An end 66 of conduit 54 is within shell 60, and a third end ring 68 is fixed to conduit end 66 by welding. The outer diameter of ring 68 is less than the inner diameter of shell 60 to accommodate relative axial movement between conduit 54 and shell 60. A flexible coupling means in the form of an axially expandable metal bellows 70 is connected to end 66 of conduit 54 and to shell 60. In particular, one end of bellows 70 is welded to a first end band 72 which, in turn, is welded to end ring 68, and the opposite end of bellows 70 is welded thereto. The inner diameter of end band 74 is of sufficient size to provide a gap or clearance 76 between band 74 and the outer surface of conduit 54. Bellows 70 allows relative axial movement between the ends of conduits 52 and 54 operatively associated with expansion joint 50, and bellows 70 provides a fluid seal between the interiors of conduits 52,54 and the gap or opening 76 between band 74 and conduit 54 at the one end of expansion joint 50.

As in the embodiment of FIG. 1, in the event of a major failure of bellows 70 such as a leak or rupture therein, the gap or clearance 76 can provide an escape path for high pressure and temperature fluid such as steam in an axial direction out of the end of expansion joint 50 with consequent safety hazards arising from such flow. In accordance with the present invention, expansion joint 50 includes flow restrictor means generally designated 80 operatively associated with shell 60 and conduit 54 for restricting flow of fluid through opening 76 in the event that bellows 70 fails to maintain a fluid seal between the interiors of conduits 50,54 and the opening 76. In particular, flow restrictor means 80 comprises a member in the form of a ring 82 having inner and outer annular surfaces 84 and 86, respectively and having opposite axial end faces 88 and 90. The diameter of ring annular inner surface 84 is just slightly larger than the outer diameter of conduit 54 so that ring 82 surrounds conduit 54 in closely-fitting but axially movable relation, i.e. so that conduit 54 can move axially within ring 82. The diameter of ring outer annular surface 86 is less than the diameter of the inner surface of shell 60 by an amount sufficient to accommodate movement of conduit 54 toward and away from shell 60, i.e. movement in a radial direction and/or canting movement of conduit 54 about the longitudinal axis. As mentioned in connection with the embodiment of FIG. 1, such movements of conduit 54 in other than axial directions can occur during installation of expansion joint 50 and during operation thereof. Flow restrictor means 80 further comprises a retainer member in the form of an outer end ring 94 fixed to shell 60 and co-operating with end ring 62 to hold flow restrictor ring 82 against axial movement relative to shell 60. The outer annular surface of ring 94 contacts the inner surface of shell 60 and ring 94 is fixed to shell 60 by welding adjacent the axial end face of shell 60. The inner annular surface of ring 94 is of a diameter larger than the outer diameter of conduit 54 by an amount sufficient to define an annular gap or clearance 98 of a radial dimensions adequate to accommodate the afore-mentioned movements of conduit 54 in other than an axial direction. By way of example, in an illustrative expansion joint, such gap or clearance 98 is about 1/16 inch in length in a radial direction. Thus, end ring 94 co-operates with end ring 62 to define an annular region containing flow restrictor ring 82 and holding ring 82 against axial movement relative to shell 60 but allowing limited movement of flow restrictor ring 82 in a direction substantially normal to the longitudinal axes of conduit 54 and shell 60.

During normal operation of expansion joint 50, the ends of conduits 52,54 can move axially toward and away from each other, such axial movement being accommodated by flexible bellows 70. During movement of conduit 54 within shell 60 the flow restrictor ring 82 slides on the outer surface of conduit 54. In other words, ring 82 can have sliding contact with conduit 54. The opposite axial end faces 88 and 90 of ring 82 similarly can have sliding contact with the adjacent axial end faces of end rings 62 and 94, respectively. During such normal operation of expansion joint 50, flexible bellows 70 maintains a fluid-tight seal between the interiors of conduits 52,54 containing high temperature and high pressure fluid such as stream and the annular gap or clearance 76 at the end of expansion joint 50 which receives conduit 54. In the unlikely event of a major failure of bellows 70 in maintaining the aforementioned fluid tight seal, such as a leak or rupture occurring in bellows 70, the safety flow restrictor means 80 of the present invention serves to limit and restrict flow of high pressure and high temperature fluid through space 76 out the adjacent end of expansion joint 50. The close-fitting relationship between the surfaces of ring 82 and the outer surface of conduit 54 and the axial end surfaces of rings 62 and 94 provides a severely restricted passage for flow of such escaping high pressure, high temperature fluid.

As in the expansion joint 10 of FIG. 1, expansion joint 50 has a base 100 and a drain opening closed by plug 102. If desired, a stop member in the form of a sleeve 106 can be fixed to the outer surface of conduit 54 such as by welding and at a predetermined axial location spaced from end ring 68 such that sleeve 106 abuts flow restrictor ring 82 when conduit 54 reaches a predetermined limit of axial travel outwardly of expansion joint 50, i.e. to the right as viewed in FIG. 2. By way of example, in an illustrative expansion joint, bellows 70 is of INCONEL 600 alloy and all the other components including flow restrictor ring 82 and end rings 62 and 94 are of carbon steel. The expansion joint 50 typically operates at a pressure of 300 pounds steam, although higher pressures can be accommodated.

Figure 3:
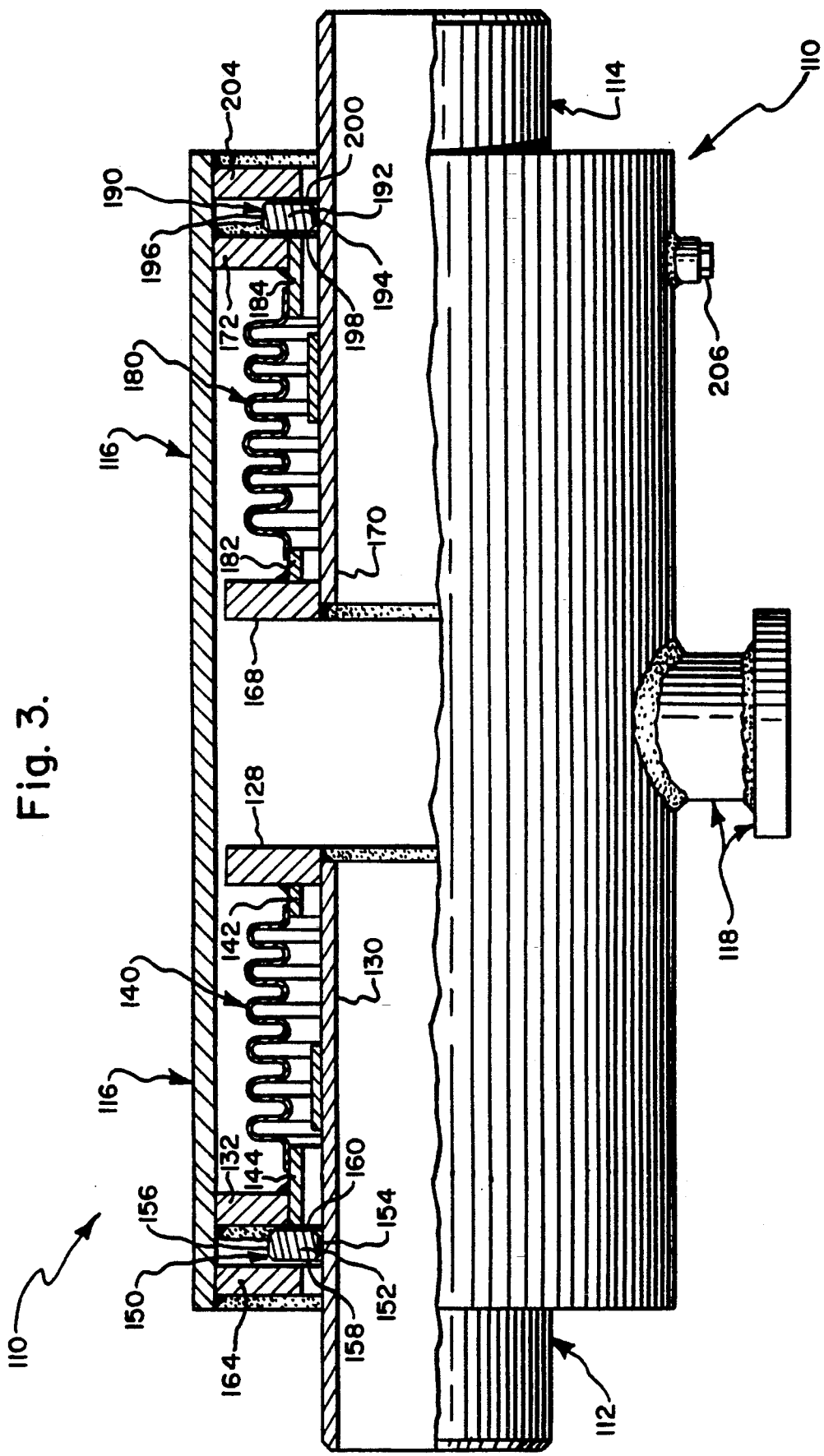
FIG. 3 is a side elevational view, partly in section, of an expansion joint of the type shown in FIG. 1 but accommodating two conduits and provided with the safety flow restrictor of the present invention.

FIG. 3 illustrates a double externally pressurized expansion joint 110 provided with the safety flow restrictor of the present invention. Expansion joint 110 includes two conduits or pipes 112, 114 axially movable in opposite ends of a single external shell or housing 116 which is anchored or mounted via a base 118 to a suitable supporting surface. Conduits 112 and 114 are guided externally for axial movement within shell 116 in a manner known in the art. There is provided a pair of flexible bellows, each one connected to shell 116 and to a corresponding one of conduits 112,114 and a pair of safety flow restrictor means each operatively associated with shell 116 and a corresponding one of conduits 112, 114. Referring first to conduit 112, a first end ring 128 is fixed by welding to an end 130 of conduit 112, and a second end ring 132 is fixed by welding to the inner surface of shell 116 at a location a short distance axially inwardly from the end of shell 116 associated with conduit 112. The outer diameter of ring 128 and the inner diameter of ring 132 are of a dimension permitting axial movement of the end of conduit 112 within shell 116. A flexible coupling means in the form of an axially expandable metal bellows 140 is connected to end 130 of conduit 112 and to shell 116. In particular, one end of bellows 140 is welded to a second end band 144 which, in turn, is welded to end ring 132. Bellows 140 allows axial movement of conduit 112 relative to shell 116 and provides a fluid seal between the interiors of conduits 112, 114 and the gap or clearance between end ring 132 and the outer surface of conduit 112 at the one end of expansion joint 110.

There is provided first flow restrictor means generally designated 150 operatively associated with shell 116 and conduit 112 for restricting flow of fluid out the end of expansion joint 110 between end ring 132 and the outer surface of conduit 112 in the event that bellows 140 fails to maintain the afore-mentioned fluid seal. Flow restrictor means 150 comprises a member in the form of a ring 152 having inner and outer annular surfaces 154 and 156, respectively, and having opposite axial end faces 158 and 160. The diameter of ring annular inner surface 154 is just slightly larger than the outer diameter of conduit 112 so that ring 152 surrounds conduit 112 in closely-fitting but axially movable relation, i.e. so that conduit 112 can move axially within ring 152. Flow restrictor means 150 further comprises a retainer member in the form of a third or outer end ring 164 fixed to shell 116 and co-operating with the second end ring 132 to hold flow restrictor ring 152 against axially movement relative to shell 116. The outer annular surface of ring 164 contacts the inner surface of shell 116 and ring 164 is fixed to shell 116 by welding adjacent the axial end face of shell 116. The inner annular surface of ring 164 is of a diameter larger than the outer diameter of conduit 112 to accommodate axial movement of conduit 112 within ring 164.

Referring now to conduit 114, a fourth end ring 168 is fixed by welding to an end 170 of conduit 114, and a fifth end ring 172 is fixed by welding to the inner surface of shell 116 at a location a short distance axially inwardly from the end of shell 116 associated with conduit 114. The outer diameter of ring 168 and the inner diameter of ring 172 are of dimension permitting axial movement of the end of conduit 114 within shell 116. A flexible coupling means in the form of an axially expandable metal bellows 180 is connected to end 170 of conduit 114 and to shell 116. In particular, one end of bellows 180 is welded to a first end band 182 which, in turn, is welded to end ring 168, and the opposite end of bellows 180 is welded to a second end band 184 which, in turn, is welded to end ring 172. Bellows 180 allows axial movement of conduit 114 relative to shell 116 and provides a fluid seal between the interiors of conduits 112,114 and the gap or clearance between end ring 172 and the outer surface of conduit 114 at the one end of expansion joint 110.

There is provided second flow restrictor means generally designated 190 operatively associated with shell 116 and conduit 114 for restricting flow of fluid out the end of expansion joint 110 between end ring 172 and the outer surface of conduit 114 in the event that bellows 180 fails to maintain the afore-mentioned fluid seal. Flow restrictor means 190 comprises a member in the form of a ring 192 having inner and outer annular surfaces 194 and 196, respectively, and having opposite axial end faces 198 and 200. The diameter of the ring annular inner surface 194 is just slightly larger than the outer diameter of conduit 114 so that ring 192 surrounds conduit 114 in closely-fitting but axially movable relation, i.e. so that conduit 114 can move axially within ring 192. Flow restrictor means 190 further comprises a retainer member in the form of sixth or outer end ring 204 fixed to shell 116 and co-operating with the second end ring 172 to hold flow restrictor ring 192 against axial movement relative to shell 116. The outer annular surface of ring 204 contacts the inner surface of shell 116 and ring 204 is fixed to shell 116 by welding adjacent the axial end face of shell 116. The inner annular surface of ring 204 is of a diameter larger than the outer diameter of conduit 114 to accommodate axial movement of conduit 114 within ring 204.

As in the embodiment of FIG. 2, housing 116 can be provided with a drain opening closed by plug 206. If desired, stop members in the form of sleeves 212 and 214 can be fixed to the outer surfaces of conduits 112 and 114, respectively, at predetermined locations thereon for abutting rings 152 and 192, respectively, when conduits 112,114 reach predetermined limits of travel out the corresponding ends of expansion joint 110. By way of example, bellows 140 and 180 are of INCONEL 600 alloy and all the other components of expansion joint 110 including flow restrictor rings 152,192 are of carbon steel.

Each flow restrictor means 150 and 190 in the expansion joint of FIG. 3 operates in a manner identical to that of flow restrictor means 80 in the expansion joint 50 of FIG. 2. Thus, in the event of a major failure in bellows 140 or 180 such as a leak or rupture therein, the corresponding flow restrictor means 150 or 190 serves to limit and restrict the flow of high pressure and high temperature fluid out the corresponding end of expansion joint 110 by providing a severely restricted passage for flow of such escaping high pressure, high temperature fluid.

It is therefore apparent that the present invention accomplishes its intended objects. While embodiments of the present invention have been described in detail, that is done for the purpose of illustration, not limitation.

What is claimed is:

1. In an expansion joint for coupling two conduits in a manner accommodating relative axial movement between said conduits and including a housing having a longitudinal axis for receiving the ends of said conduits wherein at least one of said conduits has an end movable within said housing said flexible coupling means in said housing connected to relative axial movement between said conduits and for providing a fluid seal between the interiors of the conduits and the end of said expansion joint which receives the end of said one conduit:

flow restrictor means operatively associated with said housing and said with one conduit for restricting fluid flow out the end of said expansion joint which receives the end of said one conduit in the event that said flexible coupling means fails to maintain the fluid seal between the interiors of the conduits and said end of said expansion joint, said flow restrictor means comprising a member surrounding said one conduit in closely-fitting axially movable relation; and retainer means for holding said member against axial movement relative to said housing; so that said member and said retainer means co-operate to provide a greatly restricted passage for flow of any fluid tending to escape out the end of said expansion joint, said retainer means defining a peripheral region radially outwardly of said member to allow movement of said one conduit relative to the other conduit in a radial direction toward and away from said housing and to allowing canting movement of said one conduit about the longitudinal axis of said housing.

2. Apparatus according to claim 1, wherein said member comprises a ring having inner and outer annular surfaces and opposite axial end faces, the diameter of said ring inner annular surface being slightly greater than the outer diameter of said one conduit so that said ring surrounds said one conduit in closely-fitting axially movable relation, and wherein said retainer means comprises a pair of ring members fixed to said housing at axially spaced locations therealong and adjacent the opposite axial end faces of said ring, said ring members receiving said one conduit in a manner allowing axial movement therein, each of said ring members being in a closely fitting radially movable relation to a corresponding axial end face of said ring.

3. Apparatus according to claim 1, wherein said one conduit is provided with a stop member at a predetermined axial location thereof for abutting said member when said conduit reaches a predetermined limit of axial travel in a direction outwardly of said housing.

4. An expansion joint for coupling two conduits in substantially end-to-end relation comprising:
a) an external housing having a first wall at one end thereof joined to one of said conduits at the end thereof and having a second wall at the other end thereof provided with an opening for receiving an end of the other of said conduits in a manner allowing relative axial movement of said end of said other conduit in said housing, said housing having a longitudinally axis;
b) flexible coupling means in said housing connected to said housing near said second wall and connected to the end of said other conduit for allowing relative axial movement between the ends of said conduits and for providing a fluid seal to normally prevent flow of fluid through said opening in said second wall of said housing; and
c) flow restrictor means associated with said housing and with said other conduit for restricting flow of fluid through said opening in said second wall in the event said flexible coupling means fails to maintain in said fluid seal, said flow restrictor means comprising a member surrounding said other conduit in closely-fitting axially movable relation; and retainer means for holding said member against axial movement relative to said housing; so that said member and said retainer means co-operate to provide a greatly restricted passage flow of any fluid tending to escape through said opening in said second wall of said housing, said retainer means defining a peripheral region radially outwardly of said member to allow movement of said one conduit relative to the conduit in a radial direction toward and away from said housing and to allow canting movement of said one conduit about the longitudinal axis of said housing.

5. An expansion joint according to claim 4, wherein said member comprises a ring having inner and outer annular surfaces and opposite axial end faces, the diameter of said ring annular inner surface being slightly greater than the outer diameter of said other conduit so that said ring surrounds said other conduit in closely-fitting axially movable relation, and wherein said retainer means comprises a third wall in said housing adjacent said second wall and having an opening therein for receiving the end of said other conduit in a manner allowing axial movement therein, said second and third walls being adjacent the opposite axial end faces of said ring, each of said second and third walls being in closely-fitting radially movable relation to a corresponding axial end face of said ring.

6. An expansion joint according to claim 4, wherein said other conduit is provided with a stop member at a predetermined axial location thereon for abutting said member when said other conduit reaches a predetermined limit of axial travel in a direction outwardly of said housing.

7. An expansion joint for coupling two conduits in a manner accommodating relative axial movement between said conduits comprising:

a) an external housing having first and second walls at opposite axial ends thereof each provided with an opening therein for receiving an end of first and second conduits, respectively, in a manner allowing relative axial movement of the ends of said conduits in said housing;

b) first and second flexible coupling means in said housing connected to said housing near said first and second walls, respectively, and connected to the ends of said first and second conduits, respectively, each for allowing relative axial movement between the ends of said conduits and each for providing a fluid seal to normally prevent flow of fluid through said openings in said first and second walls, respectively; and c) first and second flow restrictor means associated with said housing and with said first and second conduits, respectively, for restricting flow of fluid through said opening in said first and second walls, respectively, in the event said first or second fluid coupling means fail to maintain said fluid seals, each of said first and second flow restrictor means comprising a member surrounding the corresponding one of said first and second conduits in closely-fitting axially movable relation; and retainer means for holding said member against axial movement relative to said housing; so that said member and said retainer means co-operate to provide a greatly restricted passage for flow of any fluid tending to escape through the corresponding opening in said first or second wall of said housing, said retainer means defining a peripheral region radially outwardly of said member to allow movement of said one conduit relative to the conduit in a radial direction toward and away from said housing and to allow canting movement of said one conduit about the longitudinal axis of said housing.

8. An expansion joint according to claim 7, wherein said member comprises a ring having inner and outer annular surfaces and opposite axial end faces, the diameter of said ring annular inner surface being slightly greater than the outer diameter of said first or second conduit so that said ring surrounds said first or second conduit in closely-fitting movable relation, and wherein said retainer means comprises another wall in said housing adjacent said first or second wall and having an opening therein for receiving the end of said first or second conduit in a manner allowing axial movement therein, said another wall and said first or second wall being adjacent the opposite axial end faces of said ring, each of said another wall and said first or second wall being in closely-fitting radially movable relation to a corresponding axial end face of said ring.

9. An expansion joint according to claim 7, wherein at least one of said first and second conduits is provided with a stop member at a predetermined axial location thereon for abutting said member when said conduit provided with said stop member reaches a predetermined limit of axial travel in a direction outwardly of said housing.

* * * * *